United States Patent Office 3,355,284
Patented Nov. 28, 1967

3,355,284
HEAT-TREATABLE CREEP-RESISTANT SOLDER
Douglas J. Harvey, Utica, Mich., assignor to General Motors Corporation, Detroit, Mich., a corporation of Delaware
No Drawing. Filed Oct. 21, 1965, Ser. No. 500,204
6 Claims. (Cl. 75—166)

This invention relates to automobile copper-brass heat exchangers such as radiators and heater cores and the like, and more particularly to a heat-treatable creep-resistant lead-base solder for use in the fabrication of such heat exchangers.

For many years automobile radiators have been fabricated using a lead-base solder. Perhaps the most common of these solder alloys consists of 70% lead and 30% tin. While this solder has sufficient strength at room temperature, it is much weaker and more subject to failure at 220° F. which is a normal operating temperature for such automotive parts. As it has become necessary, for economic reasons, to reduce the material weight of radiator and heater core brass sections, more and more stress is placed on the soldered joints. In recent years there has been an increase in the number of failures in these solder joints. These failures are due to a stress rupture or creep rupture of the lead-tin solder alloy at the operating temperature of the radiator. Therefore, it is now necessary to find a stronger solder means of joining heat exchanger sections. Preferably, a lead-base composition would be selected because of the low cost of lead. However, the strength of such a solder in the range of 220° F. and particularly the creep resistance of the alloy in this temperature region must be substantially improved over the present composition.

Accordingly, it is an object of this invention to provide a high-strength creep-resistant lead-based alloy. It is another object of this invention to provide a method of preparing a high-strength creep-resistant soldered bond. It is a more specific object of this invention to provide such a lead-based solder for use in automobile copper-brass heat exchangers at an operating temperature of about 220° F.

These and other objects are accomplished with a lead-based solder alloy comprising, by weight, 1.0 to 5.0% tin, 0.1 to 2.0% silver, 0.1 to 0.8% cadmium, and the balance substantially all lead. This solder alloy is applied in the molten state to the parts to be joined. When the solder has solidified, the joint is preferably heat treated to further improve its creep-resistant properties. This is accomplished by heating the soldered joint at 300° F. to 40° F. for about one hour and subsequently cooling to normal room temperature.

It is now well known that metals and alloys may fail in service even though they may never have been subjected to a stress as great as their yield strength or their elastic limit as determined by the conventional short-time tensile test. The cause of these failures may be either one or the other of two phenomena known as creep and fatigue. My invention relates to creep failure in lead-based solders.

When a metal or alloy is subjected to a tensile stress for a long period of time, particularly at temperatures above room temperature, it may gradually elongate or "creep." As the stress is maintained, if the temperature is high enough, the metal may continue to deform and may eventually even fail. Of course, it follows that the rate of creep increases rapidly with temperature. Thus, while the conventional 70% lead, 30% tin solder has a room temperature tensile strength of nearly 8000 p.s.i., it has a 50 hour rupture stress of only 80 p.s.i. at 220° F. This means that rupture will occur in such an alloy in 50 hours when it is loaded to a stress of 80 p.s.i. at 220° F. It would be preferable to have available a cheap solder having a greater creep resistance at automotive radiator operating temperatures.

I have made the surprising discovery that lead-based solders having a tin content of less than 5%, by weight, have a much greater rupture strength at 220° F. than do those solders containing substantially more tin. This is true despite the fact that the relationship between the room temperature tensile srengths of the respecive alloys is just the opposite. For example, an alloy of 70% lead and 30% tin has displayed a tensile strength of nearly 8000 pounds per square inch at room temperature. Yet the same alloy under a load of 1000 pounds per square inch at 220° F. will fail in a few minutes. On the other hand, a solder consisting of less than 5% tin and the balance lead has a lower tensile strength at room temperature but a substantially higher rupture strength at 220° F.

In addition to reducing the tin content of the conventional lead solder, I have found that the creep resistance may be further increased by including a small amount of silver. I have conducted numerous tests which show the desirable effect in terms of creep resistance upon the conventional lead solder of reducing tin content and adding small amounts of silver.

These tests were conducted by placing solder specimens under a constant dead weight load at a temperature of 220° F. ±1° until rupture occurred. Two types of specimens were used. The first type of specimen, characterized by an "A" in the table below, was a soldered brass assembly, and the second type of specimen "B," was an all-solder stress rupture rod. Specimen A was prepared by assemblying two 0.007" thick brass sheets (1" x 1¾"). Before assembly the brass parts were bent, 5⁄16" from the end, around a 0.020" radius to form an included angle of 45°. Soldering was done using a gas torch with the parts held in a fixture. The parts were joined at the bend. The amount of solder was held constant at 0.085 gram and a proprietary flux was used on all specimens. This soldered stress specimen was designed to simulate a soldered radiator joint and was found to give the most reproduceable results of the soldered specimens examined. Specimen B was simply a small all-solder stress rupture bar made from cast and extruded alloy. ⅛" diameter extruded solder was mechanically reduced to 0.094" diameter in the test section and the small bars were soldered to brass strips to facilitate their attachment to the loading frame.

The specimens were subjected to a constant load at a temperature of 220° F. and the time at which rupture occurred was noted. A plot was made of load versus the logarithm of the time to rupture at constant temperature. In this way, 50 hour rupure stresses were obtained for purposes of comparison of different alloys. Typical results are summarized in the table below in which all data was obtained at 220° F.

| Specimen | Pb | Sn | Ag | Load | Time |
|---|---|---|---|---|---|
|  |  | Percent | Percent |  | Hours |
| B | Bal | 30 |  | [1] 80 | 50 |
| B | Bal | 30 |  | [1] 800 | 0.2 |
| A | Bal | 30 |  | [2] 3.2 | 50 |
| A | Bal | 20 | 0.5 | [2] 3.2 | 50 |
| A | Bal | 10 | 1.0 | [2] 4.6 | 50 |
| A | Bal | 4.0 | 2.0 | [2] 14.1 | 50 |
| A | Bal | 2.0 | 1.0 | [2] 15.1 | 50 |
| A | Bal | 1.0 | 2.0 | [2] 7.3 | 50 |
| A | Bal |  | 2.5 | [2] 10.1 | 50 |

[1] P.s.i.  [2] Lbs.

In the case of specimen A, the cross sectional area could not be determined and the loads are simply dead weight loads. However, in the case of speciment B, the stress in pounds per square inch could be determined.

It is seen that lead solders with a tin composition in the range of 10 to 30% display very little improvement in creep resistance. However, I have found that by reducing the tin content below 5% and by including up to 2% silver in the solder, the 50 hour rupture stress at 220° F. is increased over four times that of the conventional solder. All of the alloys in the range of 1 to 5% tin and 0.1 to 2% silver display significant improvement in creep resistance over the conventional lead solder. As shown in the table above, the most desirable of these solders was the one consisting of 2% tin, 1% silver and the balance substantially all lead which had a 50 hour rupture stress at 220° F. of 15.1 pounds which is over 4½ times that of the conventional solder under the same conditions.

I have further found that by incorporating small amounts of cadmium, preferably 0.1% to about 0.8%, by weight, in the lead-tin-silver alloy mentioned above, a further increase in creep resistance is obtained. In accordance with my invention, suitable compositions for my alloys comprise 1 to 5% tin, 0.1 to 2% silver, 0.1 to 0.8% cadmium and the balance substantially all lead. Typical rupture stress data for these alloys are summarized in the table below. Once again the data is for 50 hour rupture at 220° F.

| Specimen | Pb | Sn | Ag | Cd | Heat Treat., ° F. | Load, p.s.i. |
| --- | --- | --- | --- | --- | --- | --- |
| B | Bal | 2.0 | 1.0 | 0.2 | None | 1,050 |
| B | Bal | 2.0 | 1.0 | 0.2 | *350 | 1,360 |
| B | Bal | 2.0 | 1.0 | 0.2 | *450 | 1,290 |
| B | Bal | 2.0 | 1.0 | 0.4 | None | 1,140 |
| B | Bal | 2.0 | 1.0 | 0.4 | *350 | 1,210 |
| B | Bal | 2.0 | 1.0 | 0.8 | None | 1,000 |
| B | Bal | 2.0 | 1.0 | 0.8 | *350 | 1,070 |
| B | Bal | 5.0 | 0.75 | 0.2 | None | 680 |
| B | Bal | 5.0 | 0.75 | 0.2 | *350 | 720 |
| B | Bal | 5.0 | 1.0 | 0.2 | None | 700 |
| B | Bal | 5.0 | 1.0 | 0.2 | *350 | 780 |
| B | Bal | 5.0 | 0.5 | 0.2 | None | 620 |
| B | Bal | 5.0 | 0.5 | 0.2 | *350 | 680 |
| B | Bal | 2.0 | 0.5 | 0.2 | None | 860 |
| B | Bal | 2.0 | 0.5 | 0.2 | *350 | 950 |
| B | Bal | 2.0 | 0.75 | 0.2 | None | 1,160 |
| B | Bal | 2.0 | 0.75 | 0.2 | *350 | 1,260 |

*Heated one hour at this temperature.

The data in the above table illustrates a relatively wide range of rupture stresses over the operable composition range of my invention. The preferable composition of alloys having particularly good creep resistant properties lies within the range comprising 1.75 to 2.25% tin, 0.75 to 1.25% silver, 0.15 to 0.25% cadmium and the balance substantially all lead. Alloys within this range start to melt at about 588° F.

I have also found that the creep resistance of the above alloys is further increased by an age hardening heat treatment. In many soldering applications, particularly automobile heat exchangers, relatively thin sections are used. When such a bonded assembly is air cooled the rate of cooling is sufficiently rapid so that the joint is effectively quenched. Thus, any second phase which might precipitate from solid solution would be trapped in solution. This appears to be the case with the subject alloy compositions. I have found that by heating samples of representative alloys within the above mentioned composition range at a temperature somewhat below their melting point for a brief period of time and subsequently recooling, the rupture stress is substantially increased. This is illustrated by the data in the above table. As indicated, some of the samples were heated one hour at temperatures of 350° F. to 450° F. and recooled. In each of these cases the creep resistance was improved.

The treatment of my alloy composition appears to be a time-temperature phenomena. If in the first instance the alloy was solidified and cooled immediately to room temperature, it can be strengthened by reheating. The higher the temperature at which the alloy is reheated, the shorter the time that is required before cooling to obtain the desired properties. As a practical matter it seems preferable to conduct this heat treatment by heating at a temperature of 300–400° F.—for a period of about one hour. At lower temperatures more time is required which seems unjustified particularly if a production-type operation is required. At temperatures above 400° F. less time is required. In a production-type operation it would probably be difficult to obtain reproducible results.

I have heated alloys of compositions in the above-stated operable range of my invention in a salt solution at about 200° F. for extended periods of time to test corrosion resistance properties. Despite the fact that some surface corrosion had taken place, the test specimen was actually stronger at 220° F. after this heating than were other specimens which had not been reheated at all. These experiments clearly illustrate that the heat treatment is effective at temperatures below 300° F.

Lead-based alloys of my invention may be prepared by completely conventional means. Individual components may be melted, thoroughly mixed and subsequently cast. If the alloy is to be used as a creep-resistant solder, it may be preferable that it be extruded or drawn in wire form for ease of application. As a solder it may be applied in the molten state to parts to be joined by well known means. After the solder has solidified and hardened to the point to which the assembly may be moved without damaging the new joint, it may then be heat treated in accordance with my invention. As mentioned above, I found it preferable to conduct the heat treatment by heating the entire assembly at a temperatre of about 300–400° F. for a period of about one hour and subsequently rapidly cooling to room temperature to prevent overaging.

In normal soldering applications, the assembly may be air cooled from the heat treat temperature without fear of overaging. However, it should be realized that if more massive sections of the alloy are used it may be necessary to use more efficient means of cooling or shorter heating periods to avoid overaging.

Thus, while my invention has been described in terms of certain specific embodiments, it is to be realized that other forms may readily be adapted by one skilled in the art and it is intended that my invention be limited only according to the following claims.

I claim:
1. A high strength creep-resistant lead-based alloy comprising, by weight, 1.0 to 5.0% tin, 0.1 to 2.0% silver, 0.1 to 0.8% cadmium, and the balance substantially all lead.
2. A high strength creep-resistant lead-based alloy comprising, by weight, 1.75 to 2.25% tin, 0.75 to 1.25% silver, 0.15 to 0.25% cadmium, and the balance substantially all lead.
3. An improved method of soldering comprised of applying molten solder to the metal parts which are to be joined, cooling said soldered joint to a temperature below the solidification range of said solder, heating said soldered joint at a temperature between about 200° F. and the melting point of said solder alloy for a length of time sufficient to age harden said alloy, and subsequently cooling to normal room temperature, said solder alloy being comprised, by weight, of 1.0 to 5.0% tin, 0.1 to 2.0% silver, 0.1 to 0.8% cadmium, and the balance substantially all lead.
4. A method of soldering in accordance with claim 3 wherein said age hardening heat treatment is conducted by heating said soldered joint at 300° F. to 400° F. for a period of about one hour.
5. A method of soldering in accordance with claim 4 wherein said solder alloy is comprised, by weight, of 1.75 to 2.25% tin, 0.75 to 1.25% silver, 0.15 to 0.25% cadmium and the balance substantially all lead.
6. A method of increasing the creep resistance of a lead-based alloy, said alloy being comprised, by weight, of 1.0 to 5.0% tin, 0.1 to 2.0% silver, 0.1 to 0.8% cadmium, and the balance substantially all lead; said method comprised of heating said alloy at a temperature between about 200° F. and the lower end of the melting range of said alloy for a time sufficient to age harden said alloy, and subsequently cooling said alloy to norml room temperature.

References Cited

UNITED STATES PATENTS

| | | | |
|---|---|---|---|
| 1,301,688 | 4/1919 | Gurevich et al. | 75—166 |
| 1,333,619 | 3/1920 | Hill | 75—166 |
| 2,148,741 | 2/1939 | Gonser | 148—158 |
| 2,375,755 | 5/1945 | Bassett Jr. et al. | 148—158 X |
| 2,551,116 | 5/1951 | Goffart | 75—166 |
| 2,570,501 | 10/1951 | Snyder | 148—158 |
| 3,043,682 | 7/1962 | Grube et al. | 75—166 |

CHARLES N. LOVELL, *Primary Examiner.*

DAVID L. RECK, *Examiner.*

UNITED STATES PATENT OFFICE
CERTIFICATE OF CORRECTION

Patent No. 3,355,284　　　　　　　　　　　　　　November 28, 1967

Douglas J. Harvey

It is hereby certified that error appears in the above numbered patent requiring correction and that the said Letters Patent should read as corrected below.

Column 1, line 49, for "40°" read -- 400° --.

Signed and sealed this 17th day of December 1968.

(SEAL)
Attest:

Edward M. Fletcher, Jr.
Attesting Officer

EDWARD J. BRENNER
Commissioner of Patents